(No Model.) 3 Sheets—Sheet 1.
J. P. ARMSTRONG.
REGISTERING PENDULUM SCALE.

No. 478,534. Patented July 5, 1892.

Witnesses
H. B. Bradshaw
L. Donaldson

Inventor
James P. Armstrong
By his Attorneys
Staley and Shepherd (No Model.) 3 Sheets—Sheet 3.

J. P. ARMSTRONG.
REGISTERING PENDULUM SCALE.

No. 478,534. Patented July 5, 1892.

Witnesses
H. B. Bradshaw
L. Donaldson

Inventor
James P. Armstrong
By his Attorneys
Staley and Shepherd

United States Patent Office.

JAMES PORTER ARMSTRONG, OF NELSONVILLE, OHIO, ASSIGNOR TO ISAAC P. PRIMROSE, J. M. HYDE, AND WILLIAM G. CROOK, OF SAME PLACE.

REGISTERING PENDULUM-SCALE.

SPECIFICATION forming part of Letters Patent No. 478,534, dated July 5, 1892.

Application filed January 11, 1892. Serial No. 417,662. (No model.)

*To all whom it may concern:*

Be it known that I, JAMES PORTER ARMSTRONG, a citizen of the United States, residing at Nelsonville, in the county of Athens and State of Ohio, have invented a certain new and useful Improvement in Weighing-Machines, of which the following is a specification.

My invention relates to the improvement of weighing-machines wherein the weights are automatically registered and added to previous weights.

The objects of my invention are to provide a weighing-machine of this class particularly adapted for weighing mine products and so arrange and construct the same as to indicate upon the proper wheels the weights of coal or other material which may be taken during different periods, to produce in connection therewith superior means for indicating separately the weights of the cargo and car, to provide improved means for automatically depositing a weight-check for each weight taken, to construct my device in a durable and reliable form, and to produce other improvements which will be more specifically pointed out hereinafter. These objects I accomplish in the manner illustrated in the accompanying drawings, in which—

Figure 1:
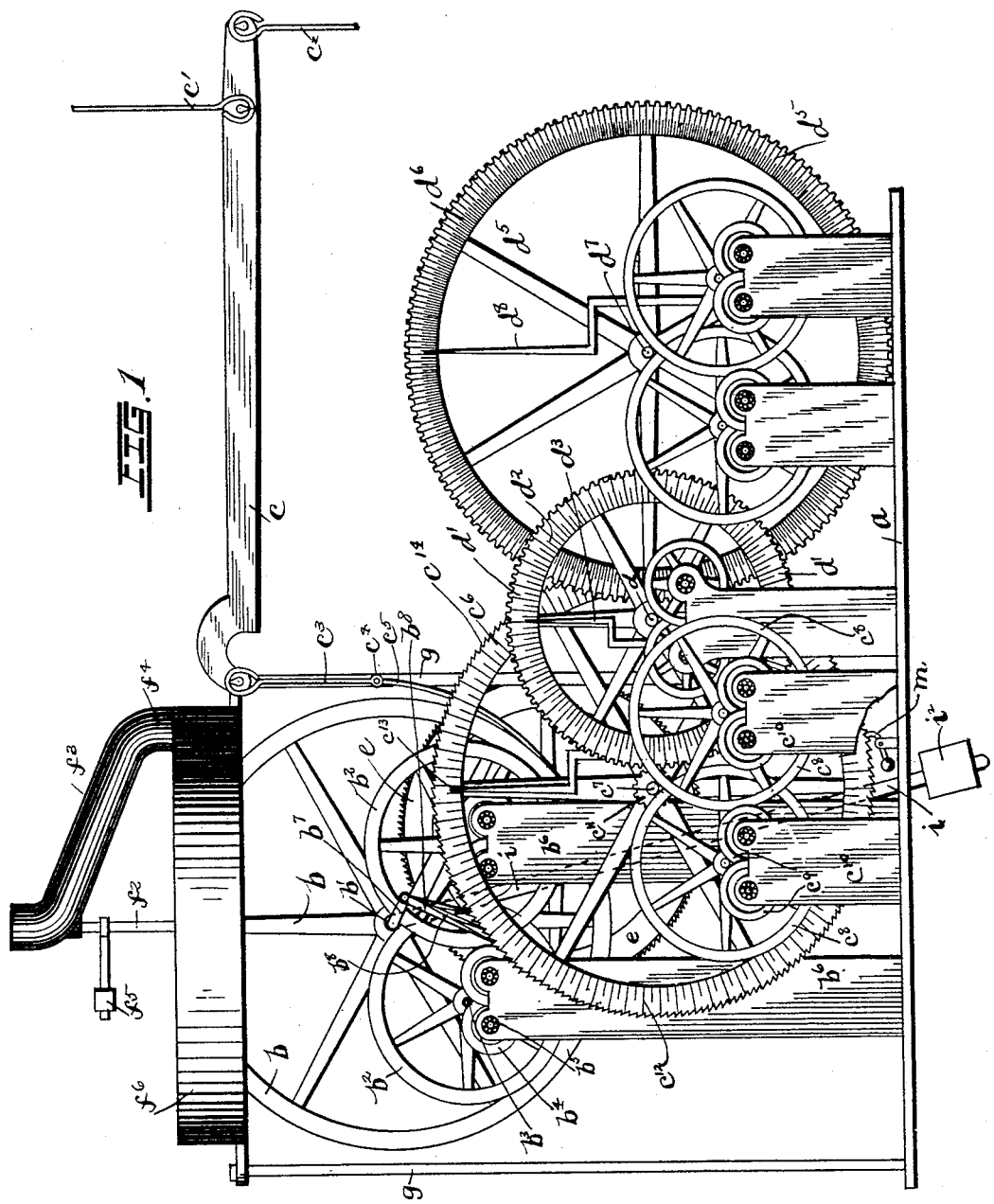
Figure 2:
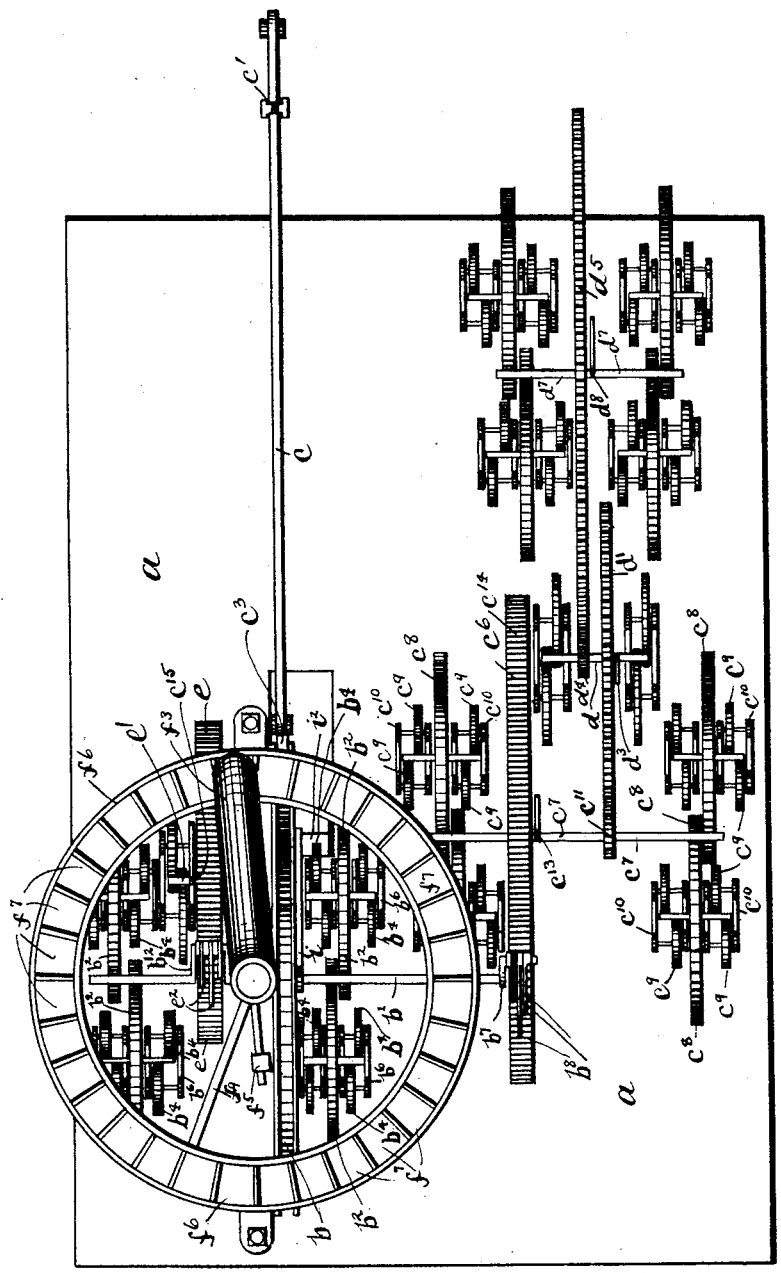
Figure 3:
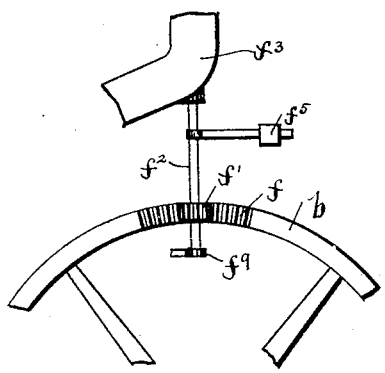
Figure 4:
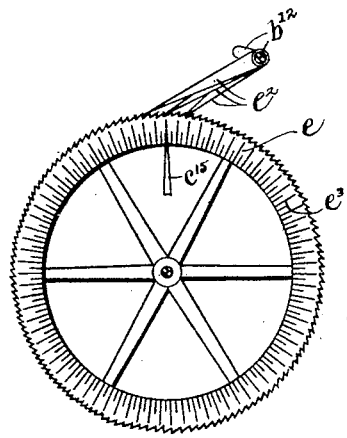

Figure 1 is a side elevation of my improved weighing-machine. Fig. 2 is a plan view of the same. Fig. 3 is a detail view in elevation of a portion of the main or operating wheel, showing in connection therewith means for rotating the wheel depositing-tube; and Fig. 4 is a side elevation in detail of the wheel which I employ for the purpose of ascertaining the weight of the cargo independent of the car.

Similar letters refer to similar parts throughout the several views.

$a$ represents a suitable frame-base, from which rises, as hereinafter described, vertical frame-pieces, which support or form bearing for the weighing mechanism.

$b$ represents the power or operating wheel, which is mounted, as shown, in the upper portion of the frame-work and through which motion is imparted to the recording-wheels, as hereinafter described. This wheel $b$ is provided with a short central shaft $b'$, which projects on opposite sides of the center thereof and the projecting ends of which bear upon the peripheries and within the crotch of two equal-sized overlapping bearing-wheels $b^2$. Each of these wheels $b^2$ is provided with a short central shaft $b^3$, which bears, as shown, upon the peripheries and within the crotches of two overlapping smaller bearing-wheels $b^4$, the shafts of which are provided with roller or other suitable bearings, (indicated at $b^5$ in the upper end portions of vertical frame-pieces $b^6$, which rise from the base $a$.) The shaft $b'$ of the wheel $b$ has its ends provided with crank projections $b^7 b^{12}$. The outer horizontal arm of said crank $b^7$ has fulcrumed or pivoted thereto the upper ends of two or more depending pawls $b^8$, which are of different lengths, as shown.

Extending in front of the power-wheel $b$ and approximately in line with the upper portion thereof is a scale-beam $c$, said scale-beam being supported from a suitable point by a suspension-rod $c'$, in the lower end of which said scale-beam is fulcrumed and balanced in the usual manner. The forward end of the scale-beam $c$ in front of its balance-point has suspended therefrom the usual or any desired form of platform-supporting rods $c^2$. To the rear end of the scale-beam $c$ is fulcrumed or jointedly connected the upper end of a hanger or counterbalance bar $c^3$, the lower end of which is hinged or jointedly connected, as shown at $c^4$, to the upper end of a metallic strip $c^5$, and the lower end of said strip being normally inclined rearwardly and connected with the periphery of the wheel $b$ at a point in front of the center thereof.

Mounted, as hereinafter described, in a position at one side and in front of the wheel $b$ is a weight-recording wheel $c^6$. This weight-recording wheel is provided with a central shaft or journal $c^7$, the projecting end portions of which bear, as prescribed for the shaft $b'$, in the crotch of two suitable bearing-wheels $c^8$, which correspond with the wheels $b^2$, and which, as prescribed for the latter, have their shafts or journals bearing between bearing-wheels $c^9$, which are supported from short vertical frame-pieces $c^{10}$. The shaft $c^7$ carries on one side of the wheel $c^6$ a pinion-wheel $c^{11}$. The outer face of the rim of the wheel $c^6$ is engraved or otherwise made to appear, marks indicating a graduated scale $c^{12}$.

$c^{13}$ is a permanent indicating hand or pointer, which rises from the frame-work and has its upper termination opposite the scale-mark rim of the wheel $c^6$. The periphery of said wheel $c^6$ is provided with inclined teeth $c^{14}$, with which are adapted to engage the lower ends of the pawls $b^8$.

$d$ represents a shaft the ends or bearing portions of which are supported, as shown, upon bearing-wheels, as prescribed for the shafts $c^7$ $b'$. This shaft $d$ extends from a point near the forward side of the wheel $c^6$ outward in a line parallel with the shaft $c^7$ and carries thereon a gear and record wheel $d'$. This wheel $d'$ is somewhat smaller than the wheel $c^6$, and as prescribed for the said latter wheel has its rim-face marked with a graduated scale, (indicated at $d^2$.) The teeth of the gear-wheel $d'$ mesh with the teeth of the pinion $c^{11}$. The wheel $d'$ is provided, as prescribed for the wheel $c^6$, with a stationary indicating-hand $d^3$, which rises from the frame-work and which has its upper termination opposite the scale-marks on the rim of said wheel. Between the wheels $d'$ and $c^6$ the shaft $d$ carries, as shown in Fig. 2, a pinion $d^4$, the teeth of which mesh with the teeth of a large forward gear and record wheel $d^5$, which is provided with graduated scale-marks $d^6$. The central shaft or journal of the wheel $d^5$ bears, as indicated at $d^7$, upon bearing-wheels which correspond in construction and arrangement with the wheels $c^8$. This wheel $d^5$ is also provided with a stationary indicating-hand $d^8$, which corresponds in form and arrangement with the hands $d^3$ $c^{13}$.

$e$ represents a record and ratchet wheel, which is carried upon a shaft $e'$, the latter being journaled, as prescribed for the shaft-carrying wheels hereinbefore mentioned, on the opposite side of the operating wheel from that on which is located the wheel $c^8$. This wheel $e$ is of such size and arrangement as to admit of the ends of two or more pawls $e^2$, which depend from the crank $b^{12}$ of the shaft $b'$, engaging with the teeth on the periphery thereof. As shown in Fig. 4 of the drawings, the outer face of the rim of the wheel $e$ is provided with graduated scale-marks $e^3$ and a stationary indicator-hand $c^{15}$, which projects in front of said scale-marks. The normally-upper portion of the power or operating wheel $b$ is provided on its rim with segmental racks $f$, with which engage the teeth of a pinion $f'$, which is carried on a vertical shaft or spindle $f^2$. This spindle has its lower end pivotally supported in a suitable bracket $f^9$, from which said spindle rises to a point above the wheel $b$. The upper end of the spindle $f^2$ supports, as shown in the drawings, a suitable check-tube $f^3$, which from its supporting-point are inclined outward and downward vertical bends, (indicated at $f^4$.)

$f^5$ represents a suitable counter-balance, which projects from the spindle $f^2$ in that side thereof, which is opposite the tube $f^3$. Rising from the base $a$ are suitable standards $g$, between the upper portions of which is supported an annular check-box $f^6$. This ring-shaped box is, as shown in the drawings, provided with radial partitions, which will result in the formation of a series of compartments $f^7$, arranged in a circular form in the box. The annular box $f^6$ is of such size and location as to bring the lower termination of the tube $f^3$ immediately above and adjacent to the compartments $f^7$.

Affixed to the shaft $b'$, adjoining the hub of the wheel, is the upper end of a downwardly-extending weight-arm $i$, which, extending downward through a suitable opening in the base $a$, carries on its lower end a weight $i^2$. A pawl $m$, pivoted to the frame beneath the wheel $c^6$ and adapted to engage with the teeth of the latter, will prevent the backward movement of the train of wheels.

The operation of my improved weighing mechanism is as follows: The load of ore or other substance to be weighed is suspended in the usual or any desired manner from the beam-rod $c^2$, thus resulting in a downward movement of the forward end of said beam and in an upward movement of the rear end thereof. This upward movement of the beam will result through the connection of the rod $c^3$ and strap $c^5$ and the connection of the latter with the wheel $b$ in a partial rotation of said wheel. This rotation of the wheel $b$ and its shaft $b'$ will result in the upward movement in the arc of a circle of the crank $b^7$ and in the engagement of the pawls $b^8$ with the higher teeth on the wheel $c^6$. This movement of the shaft $b'$ will also result in the upward movement in the arc of a circle of the weight $i^2$. When the scale-beam is released from the weight of the platform thereof, the upward movement of the outer end of said beam will result in connection with the consequent downward movement of the weight $i^2$ in turning the power-wheel $b$ to its normal position and in a consequent downward movement of the crank $b^7$. This movement of the crank $b^7$ will result through the engagement of the pawls $b^8$ with the teeth of the wheel $c^6$ in partially rotating said wheel. The parts thus moved are so adjusted and arranged with relation to each other and with relation to the scale upon the wheel $c^6$ as to result in the stationary pointer $c^{13}$ being brought opposite that scale-mark which indicates the weight in tonnage or otherwise of the load previously suspended from the scale-beam. It is evident that the amount thus registered or indicated upon the rim of the wheel $c^6$ will be regulated by the extent of movement of the pawls $b^8$ and that this movement of said pawl is regulated by the extent of movement or rotation of the wheel $b$. As each successive load of ore or other material is thus weighed, it will be seen that the weight amounts will be added and the additions indicated by the indicating-hand $c^{13}$.

In order to carry and retain the weight amounts beyond those which might be indicated by one complete revolution of the wheel $c^6$, I employ a wheel $d'$, which, owing to its gear connection with the pinion of the wheel-shaft $c^7$, is driven at much slower speed than the wheel $c^6$. This wheel $d'$ will operate to indicate the weights taken after the wheel $c^6$ has made a number of revolutions. In order to still further record or register the weights taken, I have employed the wheel $d^5$, which, being larger and traveling at a speed less than the wheel $d'$, is capable of showing the total of the accumulated weights of the wheels $c^6$ $d'$ after the latter have made many revolutions. In this manner the pointer of the wheel $d^5$ might indicate for a month or even greater period of time the amount of coal or ore weighed within said period.

My method of ascertaining the separate weights of a car and the cargo to be placed therein is as follows: The car or other receptacle being placed upon the scale-platform, it is evident that the partial rotation of the shaft $b'$ will result in a corresponding partial rotation of the crank $b^{12}$ and in the elevation of the pawls $e^2$. When the scales are relieved from the weight of the car or other receptacle, the wheel $e$ will be driven by the pawls $e^2$ such distance as to indicate by means of the hand $c^{15}$ that scale-mark of the wheel $e$ which shows the weight of said car. The pawl $e^2$ may then be lifted or otherwise disengaged from the teeth of the wheel $e$ and the latter turned back by hand until its indicating-hand is at its starting-point. The car being returned to the scales and loaded, the independent car-weight, taken as hereinbefore described, can be deducted from the total weight of the car and cargo to ascertain the amount of the latter. At each partial rotation of the power-wheel $b$ it is evident that through the connection of the pinion $f'$ with the teeth $f$ of said wheel the spindle $f^2$ is rotated sufficiently to carry the outer end of the tube $f^3$, which is supported thereby, in the arc of a circle. A common method of keeping account of the amount of coal mined by each miner or set of miners consists in providing each of these miners or set of miners with numbered checks indicating the number of the miner or set to which he belongs. For the sake of illustration I will suppose that miner No. 7 has filled a car with coal and his check bearing his number has been previously hung in the car. When the coal is dumped into the weighing-hopper, which is supported by the scale-beam, the dumper removes the check from the car and drops it into the tube $f^3$. Owing to the fact that said tube has through the action of the wheel $b^3$ been carried opposite the proper pocket or compartment $f^7$ of the annular box $f^6$, the check containing the number of the miner is deposited in that pocket or compartment which represents the weight of the coal in the hopper. In this manner each miner or set of miners is given credit for the coal-weights indicated by the compartments in which are found the checks.

In constructing my device it is evident I may number the scale-marks upon the wheel-faces in any desired or proper manner and that the pockets or compartments of the annular check-box may be numbered to indicate different weights. It will be observed that the construction and arrangement of parts herein shown afford not only a means of retaining the gross weights taken by the scales during a long period of time but a convenient and accurate means is also supplied for indicating the weights of coal or other substances for which the miners are entitled to credit. It will be observed that the means herein shown for mounting the various wheels and running parts of my machine are such as to prevent the evil results of great friction, and that my machine is otherwise constructed in a simple, neat, and reliable manner.

Having now fully described my invention, what I claim, and desire to secure by Letters Patent, is—

1. In a weighing-machine, the combination, with the frame-work, a suspended scale-beam, a journaled power-wheel $b$, a crank on the shaft of said power-wheel, one or more pawls carried by said crank, a weight carried by said shaft, and a strap connection between the rear end of said scale-beam and said wheel $b$, of a register and ratchet wheel $c^6$, with the teeth of which said pawls are adapted to engage, as described, a graduated scale on said wheel-rim, and a stationary indicating-hand rising in front of said rim, substantially as and for the purpose specified.

2. In a weighing-machine, the combination, with the frame-work, a suspended scale-beam, a journaled power-wheel $b$, a crank on the shaft of said power-wheel, one or more pawls carried by said crank, a weight carried by said shaft, and a strap connection between the rear end of said scale-beam and said wheel $b$, of a register and ratchet wheel $c^6$, with the teeth of which said pawls are adapted to engage, as described, a graduated scale on said wheel-rim, a stationary indicating-hand rising in front of said rim, a pinion on the shaft of said wheel $c^6$, a combination register and gear wheel $d'$ engaging therewith, and a stationary indicating-hand $d^3$ opposite the scale-marks of said wheel $d'$, substantially as and for the purpose specified.

3. In a weighing mechanism, the combination of the frame-work, a suspended beam, a journaled power-wheel $b$, a strap connection between said scale-beam and power-wheel, a crank $b^{12}$ on the shaft of said power-wheel, pawls $e^2$, carried by said shaft, a weight $i^2$, depending from said shaft, and a register and ratchet wheel $e$, journaled adjacent to said pawls $e^2$, the latter adapted to engage with the teeth of said register and ratchet wheel $e$, substantially as and for the purpose set forth.

4. In a weighing-machine, the combination of the frame-work, a suspended scale-beam, a journaled power-wheel $b$, cranks $b^7$ $b^{12}$ on the shaft of said power-wheel on the opposite side of the latter, one or more pawls carried by each of said cranks, a weight carried by said shaft, a strap connection between the rear end of said scale-beam and said wheel $b$, a register and ratchet wheel $c^6$, with which said pawls $b^8$ are adapted to engage, as described, and a register and ratchet wheel $e$, with which the pawls $e^2$ are adapted to engage, and stationary indicating-hands, as described, for each of said ratchet and register wheels, substantially as and for the purpose specified.

5. In a weighing-machine, the combination, with the frame-work, a suspended scale-beam, a journaled power-wheel $b$, a weight depending from the shaft thereof, and a strap connection between the scale-beam and wheel $b$, of an annular check-box $f^6$, having compartments $f^7$, a pivoted spindle or standard $f^2$, a check-tube $f^3$, supported thereby and adapted to be rotated therewith, a pinion-wheel on said spindle, and a check-segment with which said spindle is adapted to engage, substantially as and for the purpose specified.

JAMES PORTER ARMSTRONG.

In presence of—
HENRY FULTON,
W. C. HICKMAN.